United States Patent Office 2,888,118
Patented May 26, 1959

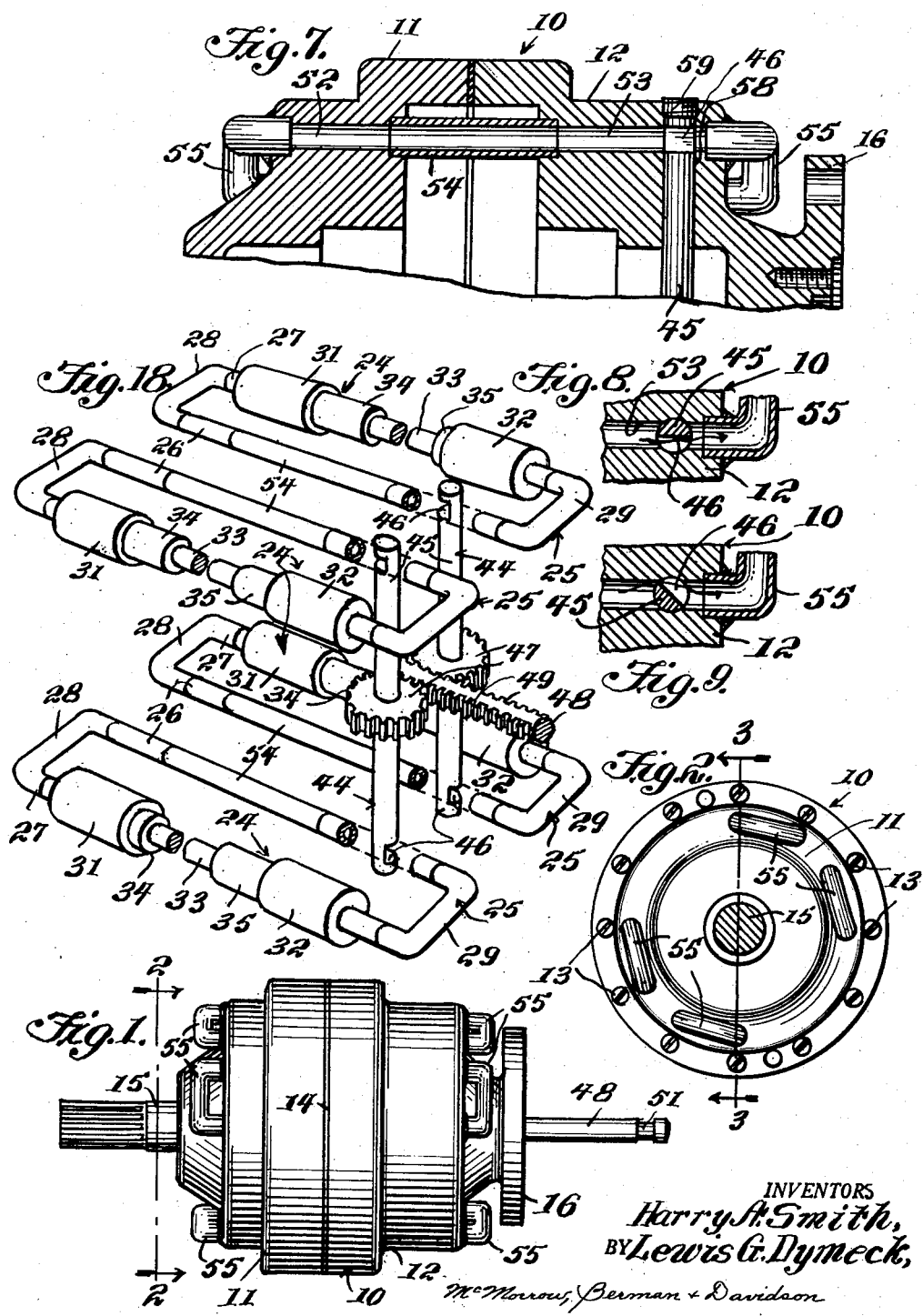

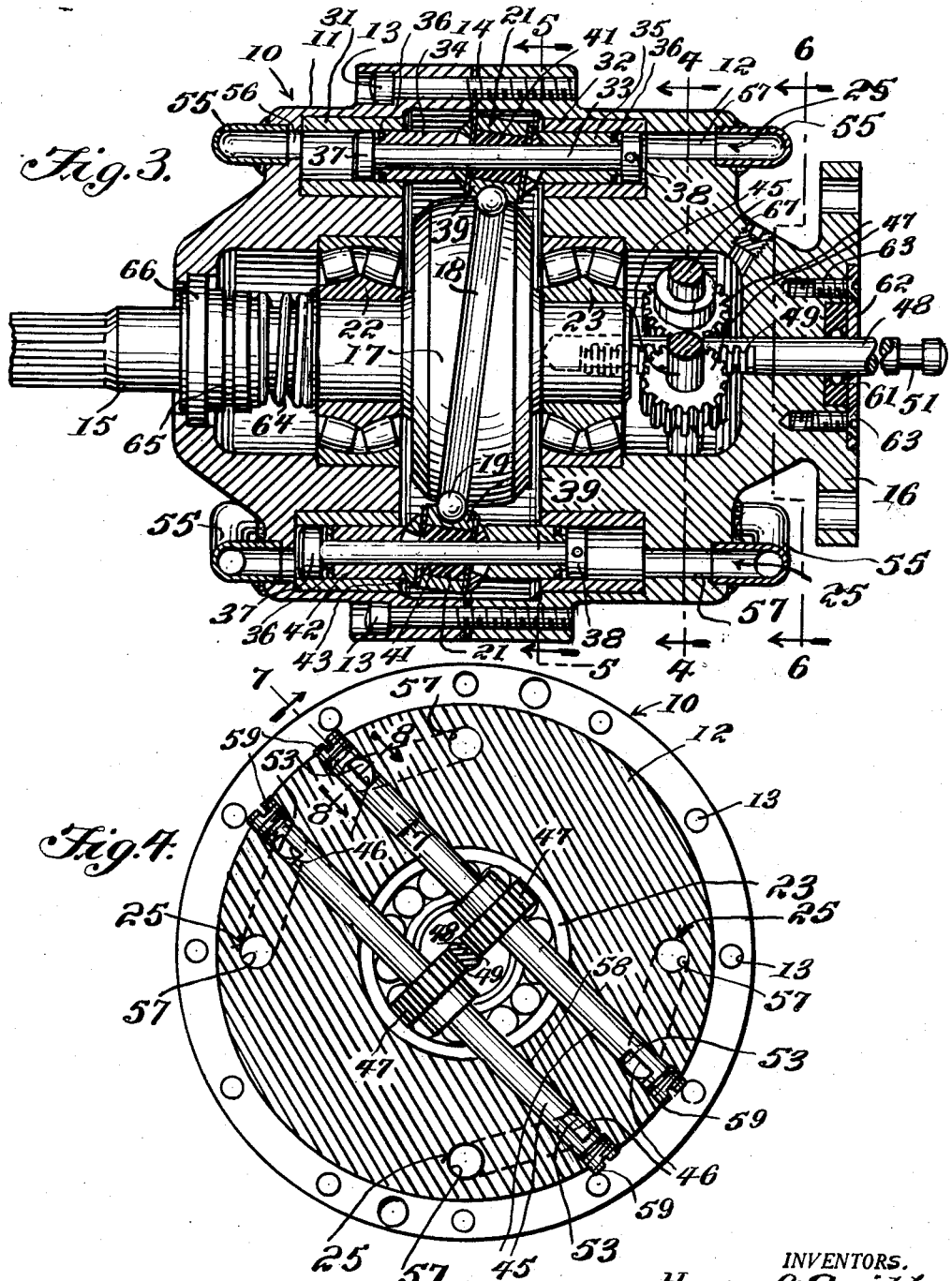

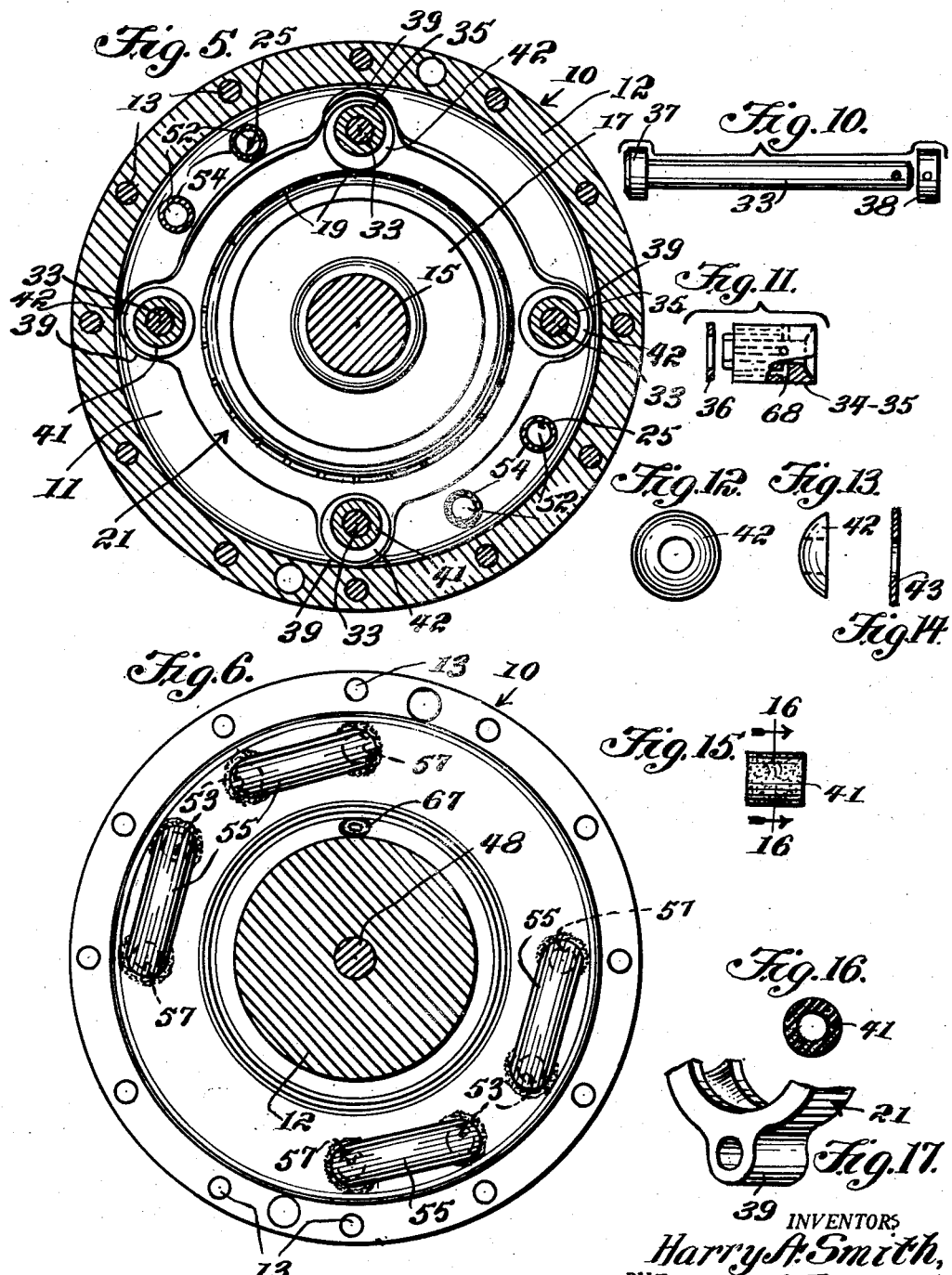

2,888,118

HYDRAULIC TRANSMISSION

Lewis G. Dymeck and Harry A. Smith, Tucson, Ariz.

Application February 15, 1957, Serial No. 640,536

1 Claim. (Cl. 192—59)

The present invention relates to a hydraulic transmission of the variable speed type.

An object of the present invention is to provide a variable speed hydraulic transmission which lends itself to installation in power transmission, and one which provides smooth speed variations through all speed ratios between the drive and driven members.

Another object of the present invention is to provide a variable speed hydraulic transmission which is compact in size with few moving parts, which is readily assembled and disassembled, is sturdy in construction and simple in structure, is economically feasible, and which is highly effective in action.

These and other objects and advantages of the present invention will be fully apparent from the following description when taken in connection with the annexed drawings, in which:

Figure 1 is an elevational view of a hydraulic transmission having the features of the present invention;

Figure 2 is an end view taken on line 2—2 of Figure 1;

Figure 3 is a sectional view on an enlarged scale on the line 3—3 of Figure 2;

Figure 4 is a sectional view taken on line 4—4 of Figure 3;

Figure 5 is a sectional view taken on line 5—5 of Figure 3;

Figure 6 is a sectional view taken on line 6—6 of Figure 3;

Figure 7 is a fragmentary sectional view taken on line 7—7 of Figure 4;

Figure 8 is a fragmentary sectional view taken on line 8—8 of Figure 4, showing the valve in open position;

Figure 9 is a view similar to Figure 8, showing the valve in closed position;

Figure 10 is an elevational exploded view of one of the piston rods of the piston rod assemblies;

Figure 11 is an elevational exploded view of one of the piston heads, shown with its associated pump cylinder sealing means;

Figure 12 is an elevational view of a component of the piston rod assembly;

Figure 13 is an end view of the component shown in Figure 12;

Figure 14 is a sectional view of one of the components of the piston assembly;

Figure 15 is an elevational view of the resilient bushing of the piston assembly;

Figure 16 is a sectional view taken on line 16—16 of Figure 15;

Figure 17 is a fragmentary perspective view of the oscillator ring component; and Figure 18 is a schematic view in perspective of the pumps, valves, and the valve control means of the present invention.

Referring in greater detail to the drawings in which like numerals indicate like parts throughout the several views, the variable speed hydraulic transmission according to the present invention comprises a casing 10 formed of two portions 11 and 12 secured together by bolts 13. Suitable sealing means such as the gasket 14 is interposed between the portions 11 and 12 to provide an oil-tight enclosure.

The portion 11 of the casing 10 has an open end through which extends a driven shaft 15. The portion 12 has a closed end and means thereon, embodying a flange 16, for attachment of the casing 10 to a flywheel, drive shaft or other power source.

A rotor 17 having beveled ends and an arcuately curved peripheral surface is carried by the driven shaft 15 inwardly of the one end which is within the casing 10.

A raceway 18 extends about the periphery of the rotor 17 and constitutes the inner raceway for a plurality of ball bearings 19. An oscillator ring 21, shown in fragmentary perspective view in Figure 17, has a raceway extending about and supported upon the ball bearings 19 in the raceway 18. As shown most clearly in Figure 3, the raceway 18 is disposed at an angle with respect to the axis of rotation of the driven shaft 15.

Suitable anti-friction bearing assemblies 22 and 23 are positioned one on each side of the rotor 17 and support the driven shaft 15 within the casing 10.

The present invention provides a plurality of double-acting reciprocating pumps, indicated generally by the reference numeral 24 in Figure 18, each operable in an endless or closed passageway which is filled with hydraulic fluid. The pumps 24 are positioned in parallel spaced relation about the end portion of the shaft 15 which is within the casing 10. The passageways, indicated generally in Figure 18 by the reference numeral 25 are also arranged in parallel spaced relation about the shaft portion within the casing 10 and each passageway 25 embodies a pair of longitudinally extending branches 26 and 27 connected at their complemental ends by a transverse branch 28 and 29.

The pumps 24 each are double-acting and embody opposed pump cylinders 31 and 32 in the branch 27 of the passageway 25 with a piston rod 33 mounted for reciprocatory movement in the cylinders 31 and 32. The piston rod 33 carries on each end portion pistons 34 and 35 each having a sealing means, such as a resilient valve ring 36, mounted on one end thereof. The piston rod 33, shown in detail in Figure 10, has an enlarged portion 37 on one end and a detachable collar 38 on the other end each abuttingly engaging the adjacent end of the respective piston 34 or 35.

The oscillator ring 21 is provided with apertured bosses 39, four in number, in each of which is positioned a resilient bushing 41 for carrying the piston rod 33. The ends of the pistons 34 and 35 remote from the valve rings 36 are concave and receive the convex face of the adjacent one of the abutment elements 42, one of which is shown in Figures 12 and 13. A retainer 43 is circumposed about the piston rod 33 on each side of the bushing 41 between the boss 39 and the adjacent abutment element 42.

It is important to note that the resilient bushing 41 is compressed between the faces of the retainers 43 when the collar 38 on the piston rod is tightened to provide a proper running fit at the spherical surfaces of the pistons 34 and 35 and the abutment elements 42. The retainers 43 bear against the side faces of the oscillator ring with the resilient bushing yieldingly engaging the intermediate portion of the piston rod and bores in the apertured bosses 39 to provide a means for angular and linear misalignment between the oscillator ring and the reciprocating piston.

The present invention provides openable and closable valves, indicated generally by the reference numeral 44 in Figure 18 in each of the other longitudinally extending branches 26 of the passageways 25. Each valve 44 embodies a shaft 45 having a cutaway portion 46 rotatably mounted in a transversely disposed bore extending through the portion 12 of the casing 10. As shown most clearly in Figure 18, there are two shafts 45 with cutaway portions 46 at each end thereof constituting valves 44 for each of the four double-acting reciprocating pumps 24.

A spur gear 47 is carried by each of the shafts 45 intermediate the ends thereof and a rod 48 having a rack 49 on each side thereof extends into the casing 10 through the closed end of the portion 11 and has a portion adjacent one end slidably supported in the end portion of the driven shaft 15 which is within the bearing assembly 23. The projecting end portion of the rod 48 has a reduced section as at 51 for the connection of an operating lever or other means for manually shifting the rod 48 into and out of the casing portion 12 so as to effect the opening and closing of the valves 44.

Referring to Figure 7, it will be seen that the branch 26 of the passageway 25, as shown schematically in Figure 18, is formed by the aligned bores 52 and 53 in the casing portions 11 and 12, respectively, with a tubular element 54 connecting the bores 52 and 53 together. Sections 55 of pipe of U-shaped configuration form the branches 28 and 29 of the passageway 25 and are exteriorly of the casing portions 11 and 12 with the ends of their legs received in the outer ends of the bores 52 and 53 and in the outer ends of the bores 56 and 57 in the casing portions 11 and 12, respectively, which constitute, together with the cylinders 31 and 32, the branch 27 of the passageway 25.

The bores in the casing portion 12 in which the shafts 45 are supported, as indicated by the reference numeral in Figure 7, are threaded at their ends to receive threaded plugs 59 which prevent longitudinal movement of the shafts 45 in the casing portion 12 and also seal the ends of the bores 58.

Other sealing means is provided for the casing 10 at each end thereof and includes, in the portion 12, a resilient sealing member 61 held in a recess formed in the flange 16 by means of a cover plate 62 secured thereto by countersunk screw members 63. At the open end of the casing portion 11 a spring 64 has one end bearing against the bearing assembly 22 and its other end bearing against an oil seal member 65. Other sealing members 66 are received in recesses formed in the casing portion 11 and are circumposed about the adjacent portion of the driven shaft 15. A removable filling plug 67 closes a port in the casing portion 12 through which may be admitted a quantity of hydraulic fluid for the lubrication of the moving components of the hydraulic transmission of the present invention. Each of the pistons 34 and 35 are provided with oil passages 68, as shown in Figure 11, for the lubrication and for supply fluid to the chambers in the cylinders 31 behind the pistons 34 and 35 and the return to the central part of the casing 10, the valve rings 36 functioning as check valves to normally retain fluid behind the pistons and the passageways filled during operation of the device.

In operation, the casing 10 is attached to the power output of a prime mover. The driven shaft is likewise attached to a member to be driven at variable speeds. Control means connected to the rod 48 may be installed in a place accessible to the operator thereof. Upon rotation of the casing 10 with the valves 44 open, the oscillator ring 21 will revolve freely on the rotor 17. The oscillator ring 21, following the inclined path of the raceway 18, will cause the pistons 34 and 35 to reciprocate within the pump cylinders 31 and 32, respectively, causing the fluid in the system to flow first in one direction and then in the other. Manual actuation of the rod 48 by such control means as may be provided closes the valves 44 and restricts the passageways to the flow of fluid causing the pistons 34 and 35 to at first slow down in their reciprocatory movement and finally to become locked within their respective ones of the pump cylinders 31 and 32. This resistance to movement applied to the pistons 34 and 35 causes the oscillator ring 21 to impart to the rotor 17 and shaft 15 the rotational movement of the casing 10 and in the same direction. Upon opening of the valves 44 the rotor 17 will return to an "at rest" position with the oscillator ring 21 again following the inclined path of the raceway 18 reciprocating the pistons 34 and 35 freely within their pump cylinders.

The hydraulic transmission according to the present invention will be seen to provide infinitely variable speed control in a smooth manner and with the valves 44 in any selected position between open and closed, any speed ratio between the drive shaft and the member to be driven can be readily obtained.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claim are intended to be included herein.

Having thus fully set forth and described this invention what is claimed and desired to be obtained by United States Letters Patent is:

A hydraulic transmission comprising a rotatable casing, means on said casing for attachment of said casing to a source of driving power for rotation therewith, a rotatable driven shaft journalled in said casing, a rotor on said shaft there being a raceway extending about the periphery of said rotor, said raceway being disposed at an angle with respect to said driven shaft, bearing means on said raceway, said casing having a plurality of closed passageways each filled with hydraulic fluid arranged in parallel spaced relation about said shaft, each passageway embodying a pair of longitudinally extending branches and connected at each of the complemental ends by a transverse branch, a pump cylinder in one of the branches of each pair of longitudinally extending branches, a piston rod having a piston at each end mounted for reciprocatory movement in each of said cylinders, a resilient bushing carried by each of said piston rods, an oscillator ring rotatable about said bearing means and engaged by each of said bushings, an openable and closable rotatable valve in each of the other of the branches of each pair of longitudinally extending branches, means operatively connected to all of said valves and operable to shift all of said valves simultaneously between open and closed positions, said means embodying a gear connected to each of said valves and a rod having a rack thereon in engagement with said gears extending into said casing through said closed end thereof and having the portion adjacent one end slidably supported in said one end portion of said driven shaft, said oscillator ring when said valves are open actuating said pumps in response to rotational movement of said casing relative to said driven shaft, said valves when closed preventing the flow of fluid in said passageways and locking said means in said raceway whereby rotational movement of said casing is imparted to said driven shaft.

References Cited in the file of this patent

UNITED STATES PATENTS

| | | |
|---|---|---|
| 1,300,098 | Almen | Apr. 8, 1918 |
| 1,787,246 | Greening et al. | Dec. 30, 1930 |
| 1,924,508 | McCarthy | Aug. 29, 1933 |
| 2,086,889 | Anderson | July 13, 1937 |
| 2,112,934 | Stinnes et al. | Apr. 5, 1938 |
| 2,230,839 | Hulsebos | Feb. 4, 1941 |
| 2,727,607 | Colmerauer | Dec. 20, 1955 |